United States Patent [19]

Yates

[11] Patent Number: 5,376,714
[45] Date of Patent: Dec. 27, 1994

[54] FLOW POLYMER ALLOYS

[76] Inventor: John B. Yates, 38 Chrisken Dr., Glenmont, N.Y. 12077

[21] Appl. No.: 816,629

[22] Filed: Dec. 31, 1991

[51] Int. Cl.$^5$ ............................................. C08K 5/526
[52] U.S. Cl. .................................................... 524/130
[58] Field of Search ......................................... 524/130

[56] References Cited

U.S. PATENT DOCUMENTS

| | | | |
|---|---|---|---|
| 4,972,011 | 11/1990 | Richardson et al. | 524/130 |
| 5,089,566 | 2/1992 | Brown et al. | 525/396 |
| 5,096,979 | 3/1992 | Brown et al. | 525/396 |

FOREIGN PATENT DOCUMENTS

| | | |
|---|---|---|
| 0356633 | 3/1990 | European Pat. Off. . |
| 0461433A2 | 12/1991 | European Pat. Off. . |

*Primary Examiner*—Kriellion S. Morgan

[57] ABSTRACT

The present invention relates to a readily molded engineering plastic composition comprising:
  polyphenylene ether polymer; optionally
  a second polymer chosen from polyesters, polyamides and polycarbonates; and
  a flow enhancement agent which is an aluminum salt of a phosphonic acid.

11 Claims, No Drawings

FLOW POLYMER ALLOYS

FIELD OF THE INVENTION

The present invention relates to thermoplastic compositions which comprise a polyphenylene ether polymer; a polymer chosen from the group of polymers consisting of polyester polymers and polyamide polymers, and a lubricating agent, the aluminum salt of a phosphonic acid of the formula:

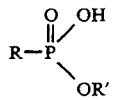

where R denotes a straight or branched chain alkyl group having one to eighteen carbon atoms optionally substituted by one or more halogen atoms or hydroxyl groups and R' is hydrogen or an alkyl group having one to eighteen carbon atoms.

These compositions have improved flow characteristics, such as flow channel, over the state of the art compositions, without significantly altering the physical properties of the molded thermoplastic materials.

Improved flow enhancement is a goal in the development of all polymer alloys that will be used in injection molding applications. As larger parts are being injection molded using engineering thermoplastics, mold lengths increase. This requires the molten thermoplastics to have better flow characteristics or to be molded under increased temperatures. As a practical matter, polyphenylene ether compositions often approach injection molding apparatus pressure limits.

For instance, in the case of automotive exterior body panels, the viscosity of the state of the art thermoplastic materials is marginally adequate and as such high injection pressures are being used in order to utilize state of the art plastic alloys and the clamping limits of the molding machines are being approached. In such borderline cases, the melt temperatures are commonly increased in order to lower the melt viscosity to an acceptable level. Such an increase in melt temperature can lead to the degradation of polymer alloys and a reduction in the physical properties of the material in its ultimately molded form. Since these physical properties are required in the applications being selected, polymer alloy compositions which can be molded at lower temperatures are desirable in order to provide improved molded pieces.

BACKGROUND OF THE INVENTION

Polyphenylene ether resins are well known in the chemical arts and exhibit desirable chemical, physical and electrical properties over a wide temperature range. This combination of desirable properties renders polyphenylene ether resins suitable for a broad range of applications, many of which have not been susceptible to the use of polymers or polymer mixtures or alloys before. Often times polyphenylene ether resins are blended or copolymerized with other resins to produce a polymer alloy system with improved properties over the nonblended resins. These improved characteristics, of course, further increase the utility of polyphenylene ether polymers of resins. PCT published application 87850 describes blends of polyphenylene ether resins with polyesters. It discloses that polyester such as poly(alkylene dicarboxylates) can be added to polyphenylene ether resins in order to improve the resistance of these resin blends to nonpolar solvents such as gas.

A requirement for the commercial use of blend compositions of polyphenylene ether and polyester polymers is that the polyester polymers not undergo substantial thermal degradation during processing when the blends are subject to common processing temperatures for polyphenylene ethers. However, these temperatures exceed the thermal decomposition temperatures for many polyester polymers, therefore limiting the range of process temperatures which can be used for such blends. The thermal degradation of these polyester polymers results in a very narrow processing temperature window for injection molding resin blends of polyphenylene ethers/polyesters.

The blend compositions of the present invention possess a lower processing temperature range than state of the art materials while maintaining the advantageous characteristics otherwise associated with such blends. Thus the blends of the present invention have a broader range of practical applications than state of the art blends.

SUMMARY OF THE INVENTION

It is an object of this invention to provide novel polyphenylene ether compositions which can be processed at lower than usual processing temperatures and method of processing thereof.

The present invention provides a thermoplastic composition which comprises: a polyphenylene ether polymer alone or combined with a polymer material chosen from the group of polymers consisting of polyesters such as polyalkylene terephthalate polymers, polyamide polymers, polycarbonate polymers and mixtures thereof; and the aluminum salt of a phosphonic acid of the general formula:

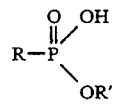

wherein R is a straight or branched chain alkyl group preferably having one to eighteen carbon atoms and more preferably is methyl, ethyl, propyl, or isopropyl, unsubstituted or substituted by one or more halogen or hydroxyl groups, and R' is hydrogen or an alkyl group preferably having one to eighteen carbon atoms and more preferably is methyl, ethyl, propyl or isopropyl.

The compositions of the present invention may be processed at lower temperatures than state of the art polymer resin blends without a significant loss of impact strength or other physical characteristics. Furthermore, these compositions may be successfully formed in injection molding processes and provide various shaped articles useful in commercial applications. Since lower molding pressures can be used less stress results in final molded products.

These advantages are provided for by supplying the composition with from about 0.1 to about 8% by weight of the aluminum salt of the phosphonic acid, as defined above. Thus the aluminum salt is about 0.1 to about 8% of the total composition. The use of such phosphonic acid salts provides increased flow channel to the resin blends without compromising the impact strength of the final molded products.

DETAILED DESCRIPTION OF THE INVENTION

The thermoplastic compositions of the present invention comprise: a polyphenylene ether polymer; a polymer composition chosen from the group of polymers consisting of polyester polymers, polyamide polymers; polycarbonates and mixtures thereof, and the aluminum salt of a phosphonic acid of the formula:

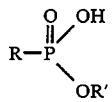

wherein R is a straight or branched chain alkyl group preferably having one to eighteen carbon atoms and more preferably is methyl, ethyl, propyl, or isopropyl, unsubstituted or substituted by one or more halogen or hydroxyl groups, and R' is hydrogen or an alkyl group preferably having one to eighteen carbon atoms and more preferably is methyl, ethyl, propyl or isopropyl.

Polyphenylene ether resins are well-known in the art and have repeating units of the formula:

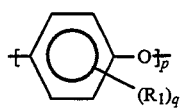

wherein $R_1$ individually denotes a radical chosen from the group consisting of halogen, alkyl, aryl and alkoxy radicals, q is an integer from 0 to 4, and p is on the average at least 20. When $R_1$ comprises an alkyl group, an aryl group or an alkoxy group, the group suitably contains from about 1 to about 12 carbon atoms.

The polyphenylene ether polymers suitable for use in the present invention are well known in the art and may be prepared by any of a number of processes known in the art from corresponding phenols or reactive derivatives thereof. Examples of polyphenylene ether resins and methods for their production are set forth in U.S. Pat. Nos. 3,306,874 and 3,306,875 (Hay), in U.S. Pat. Nos. 3,257,357 and 3,257,358 (Stralatoff) and in U.S. Pat. No. 4,935,472 (S. B. Brown et al) all of which are incorporated herein by reference. Throughout the specification and claims the term "polyphenylene ether resin" includes unsubstituted polyphenylene ether polymers, substituted polyphenylene ether polymers (wherein the aromatic ring is substituted), polyphenylene ether copolymers and blends thereof.

Polyphenylene ether polymers adapted for use in the present invention include, but are not limited to,
poly(2,6-dimethyl-1,4-phenylene) ether;
poly(2,3,6-trimethyl-1,4-phenylene) ether;
poly(2,6-diethyl-1,4-phenylene) ether;
poly(2-methyl-6-propyl-1,4-phenylene) ether;
poly(2,6-dipropyl-1,4-phenylene) ether;
poly(2-ethyl-6-propyl-1,4-phenylene) ether;
poly(2,6-dilauryl-1,4-phenylene) ether;
poly(2,6-diphenyl-1,4-phenylene) ether;
poly(2,6-dimethoxy-1,4-phenylene)ether;
poly(2,6-diethoxy-1,4-phenylene) ether;
poly(2-methoxy-6-ethoxy-1,4-phenylene) ether;
poly(2-ethyl-6-stearyloxy-1,4-phenylene) ether;
poly(2,6-dichloro-1,4-phenylene) ether;
poly(2-methyl-6-phenyl-1,4-phenylene) ether;
poly(2,6-dibenzyl-1,4-phenylene) ether;
poly(2-ethoxy-1,4-phenylene) ether;
poly(2-chloro-1,4-phenylene) ether;
poly(2,6-dibromo-1,4-phenylene) ether;
poly(3-bromo-2,6-dimethyl-1,4-phenylene) ether, copolymers
thereof and mixtures thereof and the like.

Particularly preferred polyphenylene ether polymers for use in the compositions of the present invention include
poly(2,6-dimethyl-1,4-phenylene) ether,
poly(2,3,6-trimethyl-1,4-phenylene)ether, blends of these polymers and copolymers including units of 2,3,6-trimethyl-1,4-phenylene ether and units of 2,6-dimethyl-1,4-phenylene ether. Examples of such polymers and copolymers are also set forth in U.S. Pat. No. 4,806,297.

When polyphenylene ether polymers are used without first capping, it is preferred that they be used in amounts of 95 to 5 percent by weight admixed with 5 to 95 percent by weight of a polycarbonate. Suitable polycarbonates include bisphenol A polycarbonate. In preferred embodiments the polycarbonate is from about 1 to about 35 percent by weight of the mixture. Such polycarbonates include the known polycarbonates prepared from bisphenol A (4,4'-dihydroxy-disphenyl-2,2' propane). Other useful polycarbonates including copolycarbonates as described in U.S. Pat. No. 4,806,297 which is incorporated by reference herein, see particularly columns 9 and 10 of the specification therein.

The preferred embodiments of the present invention employ polyphenylene ether polymers which are functionalized (i.e., capped). A preferred class of the polyphenylene ether polymers are the epoxy-functionalized described in commonly assigned U.S. patent application Ser. No. 07/351,903, filed May 15, 1989, entitled COMPOSITIONS COMPRISING POLYPHENYLENE ETHER-POLYESTER COPOLYMERS FROM EPOXYTRIAZINE-CAPPED POLYPHENYLENE ETHERS, Brown et. al., and Ser. No. 07/351,905, filed May 15, 1989, entitled EPOXYTRIAZINE-CAPPED POLYPHENYLENE ETHERS AND METHOD OF PREPARATION, Brown et. al., both of which are incorporated herein by reference. The epoxy-functionalized polyphenylene ether polymers are functionalized or capped with an epoxy triazine compound. Epoxidized triazine compounds suitable for use in preparing the epoxy-functionalized polyphenylene ether polymers are disclosed in the Brown et al U.S. Pat. No. 4,895,945, and are of the general formula:

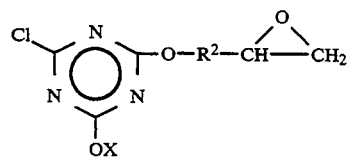

wherein —$R^2$— is a divalent hydrocarbon radical corresponding to alkyl and cycloalkyl groups, divalent mononuclear aromatic groups, aryl substituted divalent alkyl groups, and divalent heterocyclic groups, and X is an alkyl group, aromatic group, aryl substituted alkyl group, or radical of the formula

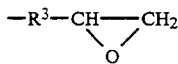

alkyl groups represented by —R³— and X include alkylene radicals having from 1 to about 18, and preferably from 1 to 6 carbon atoms in straight or branched chain configurations. Illustrative groups include methylene, ethylene, propylene, tetramethylene, decamethylene, 2-methyltrimethylene, 2.2-dimethyl-trimethylene, 3-ethylpentamethylene, and the like.

Cycloalkylene or alicyclene radicals include those with from 4 to 7 carbon atoms in cyclic-chain configurations such as cyclobutyl, cyclopentyl, methylcyclohexyl, cycloheptyl, and the like.

Aromatics include arylenes, such as phenylene and substituted phenylene, having from 6 to 12 carbon atoms in the aromatic nucleus, such as 1,4-phenylene, phenylphenylene, 4-methyl-1,2-phenylene, 2,3-naphthylene, 2,6-naphthylene, 7-methyl-2,6-naphthylene, and the like. These groups can be visualized as monovalent or divalent arylalkyl and alkylaryl groups corresponding to benzyl, ethylphenyl, phenylpropyl, and the like.

Suitable divalent heterocyclic groups are those containing from 4 to about 7 atoms in the ring, including one or more nitrogen or oxygen atoms, such as divalent groups derived from pyridine, pyran, pyrrole, pyrimidine, and the like.

A second class of preferred functionalized polyphenylene ether polymers are the phosphate-functionalized, i.e., end capped with a phosphate compound. Phosphate-functionalized polyphenylene ethers are disclosed in commonly assigned applications Ser. No. 07/654,444, filed Feb. 11, 1991, entitled SUBSTITUTED CHLOROTRIAZINES USEFUL FOR REACTIVE CAPPING OF POLYPHENYLENE ETHERS, Phanstiel et. al., Ser. No. 07/654,443, filed Feb. 11, 1991, entitled COPOLYMER CONTAINING COMPOSITIONS FROM SUBSTITUTED TRIAZINE-CAPPED POLYPHENYLENE ETHERS, and Ser. No. 07/653,586, filed Feb. 11, 1991, entitled SUBSTITUTED TRIAZINE-CAPPED POLYPHENYLENE ETHERS, Phanstiel et. al., all of which are incorporated herein by reference. In a preferred embodiment, the phosphate-functionalized polyphenylene ethers are prepared from a phosphate-substituted triazine compound.

Typical compounds used to cap these phosphate capped polyphenylene ether polymers include such phosphatetriazines as:

2-chloro-4(2-diethylphosphatoethoxy)-6-(2,4,6-trimethylphenoxy)-1,3,5-triazine 2-chloro-4-(2-dibutylphosphatoethoxy)-6-(2,4,6-trimethylphenoxy)-1,3,5-triazine 2-chloro-4-(2-dibutylphosphatoethoxy-6-(2,6-dimethylphenoxy)-1,3,5-triazine.

Such compounds and methods for their preparation are disclosed in copending and commonly assigned U.S. patent application Ser. No. 07/534,622 filed Jun 7, 1990.

A third preferred class of functionalized polyphenylene ether polymers are the ortho-ester functionalized polymers which are modified using the ortho-ester substituted triazine compounds as described in commonly assigned copending U.S. patent application Ser. No. 07/566,025, filed Aug. 13, 1990, entitled ORTHO ESTER-CAPPED POLYPHENYLENE ETHERS & COPOLYMERS PREPARED THEREFROM, Khouri et. al., and Ser. No. 07/623,838, filed Dec. 7, 1990, entitled SUBSTANTIALLY PURE HYDROXYALKYL-SUBSTITUTED CYCLIC ORTHO ESTERS & METHOD FOR THEIR PREPARATION, Khouri.

Accordingly, the polyphenylene ether polymer included in the thermoplastic compositions of the present invention may comprise one or more functionalized or non-functionalized polyphenylene ether polymers and/or copolymers, or mixtures thereof.

The second component of this thermoplastic composition of the present invention is a polymer chosen from the group of polymers consisting of polyester polymers, polyamide polymers and polycarbonate polymers and mixtures thereof. Polyester polymers are well known in the art. The preferred polyesters are the polyalkylene terephthalates polymers which are disclosed and exemplified in U.S. Pat. Nos. 4,902,753, 4,128,526, 3,953,394, 3,671,487, 3,047,539, 2,822,348, 2,727,881, 2,720,502 and 2,465,319. In the most preferred embodiments, the polyalkylene terephthalate polymer are chosen from polybutylene terephthalates, polyethylene terephthalates, and mixtures of polybutylene terephthalates and polyethylene terephthalates.

The thermoplastic compositions preferably comprise from about 5 to about 95 weight percent polyphenylene ether polymer, and from about 95 to about 5 weight percent polyester polymer, based on the weight of the polymers and from about 0.1 to about 8 weight percent of the total composition of the lubricant agent, the aluminum salt of the phosphonic acid herein defined. More preferably, the compositions comprise from about 15 to about 75 weight percent polyphenylene ether polymer, and from about 85 to about 25 weight percent polyalkylene terephthalate polymer.

The polyamide polymers useful in the present invention include polyamides such as polyamide 6, polyamide-6,6, polyamide-11, polyamide-12, polyamide-6,3, polyamide-6,4, polyamide-6,10, polyamide-6,12, as well as polyamides prepared from terephthalic acid and/or isophthalic acid; trimethylxhexamethylenediamine acid and m-xylylene-diamines; azelaic acid and 2,2-bis-(p-aminocyclohexyl) propane and from terephthalic acid and 4,4-biaminodicyclohexylmethane; mixtures and copolymers of two or more of the foregoing polyamides or polymers, respectively, are also within the scope of the invention. Polyamides may also be one or more of those referred to as "toughened nylons" which are often prepared by blending one or more of the polyamides with one or more polymeric or copolymeric elastomer testing agents. Examples of these types of materials are provided in U.S. Pat. Nos. 4,474,358; 4,474,927; 4,346,194; 4,251,644; 3,884,882; and 4,147,740.

Embodiments of the present invention comprising a polyphenylene ether polymer and a polyamide polymer should comprise from about 5 to 95 weight percent of the polyphenylene ether polymer and about 95 to about 5 weight percent of the polyamide polymer. More preferably, the compositions comprise from about 15 to about 75 weight percent of the polyphenylene ether polymer and from about 85 to about 25 weight percent of polyamide polymer based on the weight of the total composition. The aluminum salt of the defined phosphonic acid, i.e. the lubricant, should comprise about 0.1 to about 8 weight percent composition, or most preferably for about 0.1 to about 2 weight percent of the total composition. The aluminum salt lubricants are not known as lubricants for polymer alloy systems. Specific compounds which might be useful include aluminum methyl methylphosphonate and aluminum methylethylphosphonate.

Compositions of this invention may also contain additional constituents such as impact modifiers or compatibilizers with either or both of the polylphenylene ether and the second polymer (the polyalkylene terephthalate or polyamide) components suitable impact modifier included various elastomeric copolymers such as ethylene-propylene-diene's (EPDM's), unfunctionalized and functionalized with, for example, sulfonate or phosphonate groups; carboxylated ethylene-propylene rubbers; polymerized cycloalkenes; and block copolymers of alkenyl aromatic compounds such as; styrene with polymerizable olefins or dienes including butadiene, isoprene, chloroprene, ethylene, propylene and butylene.

Vinyl aromatic polymer containing units derived from a monomer of the following formula can be used:

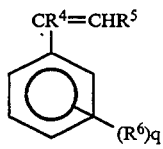

wherein $R^4$ and $R^5$ are selected from a group consisting of alkyl or alkenyl groups of from 1 to 6 carbon atoms and hydrogen, each $R^6$ is selected from the group consisting of halogen or alkyl or alkenyl groups of from 1 to 6 carbon atoms and q is an integer from 0 to 5.

Also included are core shell polymers including those containing a poly(alkyl acrylate) core attached to a polystyrene shell via an interpenetrating network as exemplified and more fully disclosed in U.S. Pat. No. 4,681,915.

Useful impact modifiers are block (di-block, tri-block or radial tele-block) copolymers of alkene aromatic compounds and dienes. Occasionally, at least one block is derived from styrene and at least one other block from the group consisting of butadiene and isoprene. Tri-block copolymers with polystyrene end blocks and diene derived mid blocks are also preferred. Selective hydrogenation is often preferred. The weight average molecular weight of the impact modifiers is often in the range of about 50,000 to 300,000. Block copolymers of this type are commercially available from Shell Chemical Company under the trademark KRATON ® and include KRATON ® D1101, G1650, G1651, G1652 and G1702. These impact modifiers, if used in the present invention, may be employed in the range of about 1 to 30 weight percent.

Polycarbonates, copolyester carbonates or polyarylates have the effect of improving impact strength of molded articles under severe molding conditions and are useful as additives in the present invention. The same purpose, improving impact strengths, is frequently served by incorporating the compositions of the present invention with at least one other compound containing a plurality of epoxide moieties (hereinafter referred to as "polyepoxide") generally in the amount of about 0.1 to 3 weight percent, preferably about 0.25 to 3 weight percent of the composition. Illustrative compounds of this type are homopolymers of such compounds as glycidyl acrylate and glycidyl methacrylate as well as copolymers thereof and glycidyl copolymers with alkyl-methacrylates, acrylonitrile and styrene. Also useful are epoxy substituted cyanurates.

Throughout the specification and claims, aromatic polymer includes unsubstituted polystyrene, substituted polystyrene and polystyrene from polymer resins. Suitable polymer polystyrene resins include, but are not limited to, polystyrene homopolymers, including atactic polystyrene, halogenated polystyrenes, polyethylmethyl styrenes, polyparamethyl styrenes, styrene-acrylonitrile copolymers, styrene-maleic anhydride copolymers, styrene-butadiene copolymers, rubber modified polystyrenes and the like mixtures are a preparation of these vinyl aromatic polymers and are well-known in the art.

In one embodiment, the vinyl aromatic polymer comprises a rubber-modified polystyrene polymer, conventionally known in the art as HIPS (high impact polystyrene). The rubber-modified polystyrene polymer may be formed by addition of a rubber to a preformed polystyrene polymer or by addition of the rubber to styrene monomer which is then polymerized in the presence of the rubber. Both of these methods are well known in the art and may be employed in producing a rubber-modified polystyrene polymer for use in the present compositions.

In a further embodiment, the vinyl aromatic polymer comprises a block copolymer of a vinyl aromatic monomer and an alkene hydrocarbon monomer or a conjugated diene monomer. Various types of such block copolymers are known in the art. For example, the block copolymer may comprise a tapered linear block copolymer and generally comprises blocks of A and B, wherein A is a polymerized vinyl aromatic hydrocarbon block and B is a hydrogenated, partially hydrogenated, or non-hydrogenated block derived from at least one polymerized conjugated diene. Tapered linear block copolymers are known in the art, as are their methods of preparation, and are taught, for example, in U.S. Pat. Nos. 4,948,832, 4,939,207, 4,918,145, 4,914,248, 4,913,971 and 4,116,917, all of which are incorporated herein by reference. Tapered triblock polymers are available commercially under the tradename Finaclear ® 520 from Fina Oil Company.

In one embodiment, the block copolymers may be represented by the formula A-B-A wherein the terminal blocks A, which may be the same or different, are thermoplastic homopolymers or copolymers prepared from a vinyl aromatic compound. Examples of the vinyl aromatic compound include, but are not limited to, styrene, alpha-methylstyrene, vinyl toluene, vinyl xylene, ethylvinyl xylene, vinyl naphthalene and the like, or mixtures thereof. The center block B comprises an elastomeric polymer derived from alkene hydrocarbons such as ethylene or butylene, conjugated dienes or the like, or mixtures thereof. The block copolymers may be subjected to a hydrogenation process whereby the unsaturated rubber block portion B of the copolymer is hydrogenated. Hydrogenation may be accomplished using coventional hydrogenation catalysts and reaction conditions. In the hydrogenated block copolymers, the terminal blocks A may have an average molecular weight of from about 4,000 to about 115,000 while the center blocks B have an average molecular weight of from about 20,000 to about 450,000. Hydrogenated block copolymers are specifically described in the Jones U.S. Pat. No. 3,431,323 and the DeLaMare et al U.S. Pat. No. 3,670,054, both of which are incorporated herein by reference. Suitable block copolymers for use in the present invention comprise hydrogenated styrene-butadiene-styrene (styrene-ethylene-butylene-styrene-block copolymers and hydrogenated styrene-isoprene-styrene block copolymers. Block copolymers of this type are commercially available under the tradenames Kraton ® from Shell Chemical and Septon ® from Kuraray Co., Ltd.

In another embodiment, the vinyl aromatic polymer comprises a radial block copolymer of a vinyl aromatic monomer and a conjugated diene monomer. These radial block copolymers are also well known in the art. Copolymers of this type generally comprise from about 60 to about 95 percent by weight polymerized vinyl aromatic monomer and about 40 to about 5 percent by weight polymerized conjugated diene monomer. The copolymer has at least three polymer chains which formed a radial configuration, and each chain usually terminates with the substantially non-elastomeric segment, to which an elastomeric polymer segment is joined. These block copolymers are also referred to "polymodal branched block copolymers" and "star polymers." Examples of radial block copolymers are set forth in the Kitchen et al. U.S. Pat. No. 3,639,517 which is incorporated herein by reference. These block copolymers are commercially available under the tradename K-Resin ® from Phillips Petroleum.

Alternatively, the radial block copolymer of a vinyl aromatic monomer in a conjugated monomer may comprise a radial teleblock copolymer which contains segments or blocks which themselves comprise a conjugated diene polymer, vinyl aromatic polymer blocks, and a coupling agent. These block copolymers are sometimes referred to as "branched" polymers and are set forth in U.S. Pat. No. 4,097,550, which is incorporated herein by reference. The radial teleblock copolymers are prepared by methods known in the art, for example, as disclosed in the Zelinski et al. U.S. Pat. No. 3,281,383, incorporated herein by reference. These polymers are also available commercially, for example, as the Finaprene ® products, grades 401, 411, 414, 416 and 417, from Fina Oil Company.

When the compositions of the invention include one or more of the vinyl aromatic polymers as discussed above, it is preferred that the vinyl aromatic polymer is included in an amount of from about 1 to about 30 weight percent.

The compositions prepared according to the present invention may be made according to to any method known in the art such as melt mixing or compounding. For instance, the polyphenylene ether polymer and polyalkylene tetaphthalate may be prepared by melt mixing or compounding. The aluminum salt of the phosphonic acid the lubricant may be added prior to or during melt compounding. Due to the improved workability of the compositions of the present invention, they may be easily formed into various products and sheet formed or may be injection molded to form various shaped articles.

Finally, the composition of the present invention may also include additional conventional ingredients such as fillers, flame retardants, pigments, dyes, stabilizers and antistatic agents, crystallization, reinforcing agents, and mold release agents.

EXAMPLE

Base compositions comprising 30 parts by weight of an epoxy functionalized polyphenylene ether polymer; 60 parts by weight of a polybutylene terephthalate polymer were made. Further components were added, as indicated in Table 1, such as parts by weight of aluminum methyl methylphosphonate (AMMP).

TABLE 1

| Sample No. | Impact Modifier (parts by weight)* | AMMP (parts by weight) |
|---|---|---|
| 1 | 10 | 0 |
| 2 | 10 | 0.25 |
| 3 | 10 | 0 |
| 4 | 10 | 0.5 |

*The impact modifier used was the radial teleblock copolymer sold by Fina Oil Company as FINAPRENE ® 416. A Werner Pfleiderer twin screw extruder (30 millimeter) was charged with the components of the composition. The extruder was run at 550° F., 350 RPM with vacuum (20 inch) applied to the melt. The extruded strands were chopped into standard size injection molding beads and dried to remove water. The beads are molded into standard ASTM test samples.

The composition was molded into shapes and physically characterized. The results are reported in Table 2.

TABLE 2

| Sample No. | HDT | Flow Channel | Notched Izod | Tensile Strength | Tensile Elongation |
|---|---|---|---|---|---|
| 1 | 338 | 25.5 | 5.7 | 6100 | 41 |
| 2 | 338 | 27.0 | 4.1 | 6000 | 56 |
| 3 | 330 | 25.5 | 4.7 | 6400 | 47 |
| 4 | 329 | 29.0 | 5.7 | 6000 | 52 |

HDT (heat distortion temperature) is reported in °F. at 66 psi load according to ASTM procedure D648.

Flow channel is reported in inches by molding into a 0.25 inch by 0.125 inch channel with the molding machine barrel set at 525° F., a 150° F. mold temperature and 10,000 p.s.i. injection pressure.

Notched Izod is reported in ft-lb/in. according to ASTM-D256.

Tensile properties are reported in psi at yield (for strength) and in % at break (for tensile elongation) both according to ASTM D638.

As can be appreciated, even minor amounts of the lubricant aluminum methyl methyl phosphonate improve the flow channel with only minor affects on the impact and tensile characteristics of the molded materials.

Similar base compositions as described were made with the additional components reported below.

TABLE 3

| Sample No. | Impact Modifier** (parts by weight) | AMMP (parts by weight) |
|---|---|---|
| 5 | 10 | 0 |
| 6 | 10 | 1 |
| 7 | 10 | 3 |
| 8 | 10 | 0 |
| 9 | 10 | 10 |
| 10 | 10 | 20 |

**The impact modifier was a block copolymer sold by Shell Chemical as Kraton D-1102.

The compositions were molded and characterized as follows:

TABLE 4

| Sample No. | HDT | Flow Channel | Notched Izod | Tensile Strength | Elongation | Burn |
|---|---|---|---|---|---|---|
| 5 | 331 | 19.5 | 16.5 | 6300 | 41 | — |
| 6 | 327 | 22.5 | 13.3 | 6000 | 63 | Yes |
| 7 | 326 | 22.0 | 12.7 | 5900 | 80 | Yes |
| 8 | 320 | 20.0 | 14.9 | 6100 | 41 | Yes |
| 9 | 317 | 27.0 | 2.7 | 5500 | 53 | Yes |

TABLE 4-continued

| Sample No. | HDT | Flow Channel | Notched Izod | Tensile Strength | Elongation | Burn |
|---|---|---|---|---|---|---|
| 10 | 313 | 28.5 | 2.9 | 5400 | 59 | Yes |

The burn test was UL-94. All other tests and reported units were as described in Table 2.

As can be seen AMMP is not a flame retardant in the polyphenylene ether/polyalkylene terephthalate alloys of the present invention. All samples burned completely. Significant improvement in flowability of the molten compositions were observed at less than 10 parts by weight AMMP (9 wt %). At 10 parts by weight there is significant decline in impact strength (Notched Izod) and tensile characteristics, however.

For polyphenylene ether/polyester alloys aluminum methyl methyl phosphonate operates as a lubricant or flow enhancer at levels from 0.1 to about 8 eight percent.

Preferably the capped polyphenylethylene ether polymers are blended or alloyed with with polyesters or polyamides as known in the art. In some cases such capped polyphenylene ether polymers are admixed with polycarbonate polymers alone or with polyesters and/or polyamides. When polyphenylene ether polymers are not capped they are preferrably admixed or alloyed with polycarbonates although they can be admixed with polyesters or polyamides. In all cases the aluminum salt of phosphoric acid is used as an additive.

The preceding example is set forth to illustrate specific embodiments of the invention and is not intended to limit the scope of the compositions of the present invention. Additional embodiments and advantages within the scope of the claimed invention will be apparent to one or ordinary skill in the art.

What is claimed is:

1. A flowable polyphenylene ether composition comprising:
   (a) from 15 to 75 weight percent polyphenylene ether polymer based on the total weight of the composition, said polyphenylene ether polymer being an epoxy functional capped polyphenylene ether polymer,
   (b) from 85 to 25 weight percent of a polyalkylene terephthalate polymer based on the total weight of the composition, and
   (c) from 0.1 to 8 weight percent of an aluminum salt of a phosphonic acid of the formula $$R-P\begin{subarray}{c}O\\ \|\end{subarray}\begin{subarray}{c}OH\\ \diagup\\ \diagdown\\ OR'\end{subarray}$$

where R denotes a straight or branched alkyl radical and R' denotes a hydrogen atom or an alkyl radical, wherein said aluminum salt is not a flame retardant in the composition.

2. A flowable polyphenylene ether in accordance with claim 1 wherein R and R' each have one to eighteen carbon atoms.

3. The composition of claim 1 which comprises about 0.1 to about 2.0 weight percent of said aluminum salt of a phosphonic acid.

4. The composition of claim 1 wherein said polyester is chosen from the group consisting of poly(ethylene terephthalate) polymers and poly(butylene terephthalate) polymers.

5. The composition of claim 4 wherein said polyester is poly(ethylene terephthalate).

6. The composition of claim 4 wherein said polyester is poly(butylene terephthalate).

7. An article made by injection molding the composition of claim 1.

8. The article of claim 7 where said article is an automotive exterior body panel.

9. The composition of claim 1 further comprising from 1 to 30 weight percent of an impact modifier.

10. The composition of claim 9 wherein the impact modifier is a block copolymer of an alkene aromatic compounds and dienes.

11. The composition of claim 10 wherein the impact modifier is selectively hydrogenated.

* * * * *